US009624972B2

(12) United States Patent
Kikuchi

(10) Patent No.: US 9,624,972 B2
(45) Date of Patent: Apr. 18, 2017

(54) LINEAR BALL BUSHING

(71) Applicant: NIPPON THOMPSON CO., LTD., Tokyo (JP)

(72) Inventor: Shunsuke Kikuchi, Gifu-ken (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 14/799,634

(22) Filed: Jul. 15, 2015

(65) Prior Publication Data

US 2016/0032966 A1     Feb. 4, 2016

(30) Foreign Application Priority Data

Aug. 4, 2014    (JP) ................................ 2014-158933

(51) Int. Cl.
*F16C 29/06*     (2006.01)

(52) U.S. Cl.
CPC ...... *F16C 29/0688* (2013.01); *F16C 29/0602* (2013.01)

(58) Field of Classification Search
CPC   F16C 29/068; F16C 29/0683; F16C 29/0685; F16C 29/0688; F16C 29/069; F16C 29/04; F16C 29/06; F16C 29/0602; F16C 29/0604; F16C 29/0611; F16C 29/0678
See application file for complete search history.

(56) References Cited

U.S. PATENT DOCUMENTS

| 3,330,606 A | * | 7/1967 | Suda | F16C 29/0688 384/43 |
| 3,788,708 A | * | 1/1974 | McCloskey | F16C 29/0688 384/43 |
| 3,887,246 A | * | 6/1975 | McCloskey | F16C 29/0688 384/43 |
| 3,975,064 A | * | 8/1976 | Nilsson | F16C 29/0688 384/43 |

(Continued)

FOREIGN PATENT DOCUMENTS

| CA | 2375792 A1 | * | 9/2003 | .......... F16C 29/0685 |
| DE | 1914941 B | * | 1/1970 | ............. B21C 23/20 |

(Continued)

*Primary Examiner* — Alan B Waits
(74) *Attorney, Agent, or Firm* — Browdy and Neimark, PLLC

(57) ABSTRACT

End rings fit over the opposite ends of the retainer inserted in the outer sleeve to keep properly the retainer against either of rotational and axial directions. End rings fit over the opposite ends of the retainer extending out of the outer sleeve to make abutment against the outer sleeve to cover the outside peripheries of the retainer. The circular groove of the retainer is composed of the raceway groove having the raceway surface with the slit, the return passage lying in parallel with the raceway groove and a pair of turnaround passages to intercommunicate between the raceway groove and the return passage. The end rings are kept in angular location against rotation by means of engagement between the first projections at the opposite ends of outer circular groove of the retainer and the second projections in the (Continued)

inside circular grooves of the end rings. The outer sleeve is to keep the retainer in lengthwise direction.

11 Claims, 15 Drawing Sheets

(56) References Cited

U.S. PATENT DOCUMENTS

| | | | | |
|---|---|---|---|---|
| 4,062,602 A | * | 12/1977 | Nilsson | F16C 29/0688 384/280 |
| 4,204,717 A | * | 5/1980 | Ernst | F16C 29/0688 384/43 |
| 4,357,056 A | * | 11/1982 | Olschewski | F16C 29/0688 384/43 |
| 4,411,478 A | * | 10/1983 | Olschewski | F16C 29/084 277/503 |
| 4,932,793 A | * | 6/1990 | Milanov | F16C 29/0688 384/43 |
| 5,244,282 A | * | 9/1993 | Imai | F16C 29/0688 384/43 |
| 5,741,078 A | * | 4/1998 | Sasaki | F16C 29/0688 384/13 |
| 6,087,919 A | * | 7/2000 | Golinelli | F16C 29/06 336/130 |
| 6,409,387 B1 | * | 6/2002 | Yokohari | F16C 31/06 384/43 |
| 8,141,448 B2 | * | 3/2012 | Watanabe | F16C 29/0688 74/424.81 |
| 9,091,301 B2 | * | 7/2015 | Chang | F16C 33/6659 |

FOREIGN PATENT DOCUMENTS

| | | | | |
|---|---|---|---|---|
| JP | 5070759 | | 6/1975 | |
| JP | 59011771 A | | 1/1984 | |
| JP | H0571445 | * | 9/1993 | |
| JP | 3025491 B1 | * | 3/2000 | ............. F16C 29/068 |
| JP | WO 2013183763 A1 | * | 12/2013 | ........... F16C 29/0688 |
| JP | 2015045365 A | | 3/2015 | |

* cited by examiner

LINEAR BALL BUSHING

FIELD OF THE INVENTION

The present invention relates to a linear bushing composed of an elongated shaft and a slider which fits over the shaft to move relative to the shaft through more than one rolling element. More especially, the present invention is concerned with a linear bushing in which a slider is constituted with an outer cylindrical shell and a retainer installed in the outer cylindrical shell to retain therein more than one rolling element.

BACKGROUND OF THE INVENTION

Conventionally, the linear bushing is composed of an elongated shaft and a slider which fits over the shaft to move along the shaft. The slider has an outer cylinder and a ball retainer made of synthetic resins and so on and installed in the outer cylinder to retain rolling elements therein. Moreover, the ball retainer is held in the outer cylinder with retainer rings which fit in grooves made at opposite ends of the outer cylinder, lest it falls off from the outer cylinder.

With the polygonal ball bushing disclosed in Japanese Laid-Open Patent Application No. S50-70 759, plane or flat surfaces are combined with curved surfaces in such a relation that apices around the polygon are inscribed with a circular surface of the housing.

One of prior ball bushings disclosed in for example Japanese Publication No. S59-11 771, which comprises a lengthwise outer sleeve with raceways formed therein, and having an axial bore and a retainer including a plurality of ball guideways distributed over the periphery thereof. The ball guideways comprise guideway sections and semicircular turnaround passages connecting the ball guideways by pairs. The balls are arranged in the ball guideways to roll through there in an endless manner. The outer sleeve having the lengthwise raceways and return passages has a length which substantially corresponds to the length of the axial guideway sections in the retainer, the retainer being made of synthetic material and projecting with the semicircular deflecting way sections beyond the outer sleeve, and end rings mounted on projecting sections of the retainer for covering the deflecting zone.

With the polygonal ball bushing constructed as stated earlier, there has been troublesome issue on assembling process. More especially, as the conventional linear bushing needs the end rings for fastening the outer sleeve of the retainer, the end rings fit into grooves which have been cut at opposite ends of an inside circular surface of the outer sleeve. The assembling procedure as stated just earlier requires many parts and components and, therefore, can lead to problems that part and components are increased in number and sophisticated in construction. With the prior ball bushings, moreover, the outer sleeve is covered with plastic-made end rings at the opposite ends projecting beyond opposite ends of the outer sleeve. Because the projecting sections around the inside circular surfaces of the end rings should be swaged against the ends of the retainer, the assembling procedure needs troublesome chores. Cuts made in the sleeve of the retainer causes the restrictions on the insert direction of the end rings into the retainer.

In the commonly assigned Japanese senior Laid-Open Patent Application No. 2015-45 365, there is disclosed a linear ball bushing in which the outer sleeve and the retainer are made in one-piece construction to reduce parts and components in number and further the retainer is placed accurately relative to the outer sleeve and fastened firmly to the outer sleeve. With the linear ball bushing constructed as stated just earlier, the retainer has at least one pair of protections projecting out of the opposite ends of the outside surface of the retainer and outer sleeve has windows extending in lengthwise direction to fit over the pair of projections. After the pair of projections has fit into the windows in the outer sleeve, the retainer is kept in place against both rotation and lengthwise movement. With the linear ball bushing constructed as stated earlier, however, as the outer sleeve has the window to expose outside the circulating circuit for the balls, there is a fear or problem that any foreign materials of dust and dirt would invade into the circulating circuit for the balls.

SUMMARY OF THE INVENTION

The present invention, therefore, has as its principal object to overcome the problems stated earlier and, in particular, to provide a linear bushing in which cost savings would be achieved in production thereof. More particularly, the present invention provides a linear bushing composed of an elongated shaft and a slider which is allowed to move relative to the shaft through more than one rolling element of ball. The slider is composed of a polygonal outer sleeve, a retainer analogous in shape and fastened in the outer sleeve to be located inside the outer sleeve, and a pair of end rings which fit over the opposite ends of the retainer to be properly positioned the opposite ends of the retainer. Thus, the linear bushing is simple in construction and makes it easier to fit accurately the outer sleeve over the end rings and further to locate the retainer preciously in either of rotational direction and the linear direction. According to the present invention, the outside circular surface of the slider is protected against exposure of the outside circular surface of the slider and invasion of dust and dirt from outside atmosphere. Moreover, the outside circular groove extending lengthwise of the retainer surface makes easier the accurate location and assembly of the outer sleeve and the end rings with the retainer.

The present invention relates to a linear bushing comprising an elongated shaft having a round shape in transverse section and a first outside circular surface which is provided thereon with a first raceway surface, and a slider which fits over the shaft for movement relative to the shaft in a lengthwise direction of the shaft through more than one rolling elements, wherein the slider is composed of a polygonal outer sleeve having a first inside circular surface which has a second raceway surface to allow the rolling elements to run through lengthwise of the slider and a return passage extending in parallel with the second raceway surface, a retainer fit into the outer sleeve, the retainer having opposite ends extending out of opposite ends of the outer sleeve, and the retainer having a second polygonal outside circular surface symmetry with the outer sleeve, the polygonal outside circular surface having more than one circulating grooves of circuitry to allow the rolling elements to move in a circulating manner, and the rolling elements of balls rolling through the circulating groove in the retainer a second inside circular surface:

wherein a pair of polygonal end rings fit over the ends of the retainer across overall lengths of the ends to makes abutment against the ends of the outer sleeve so that respective second outside surfaces cover the respective ends; and wherein the circulating groove in the retainer is composed of a raceway groove having a slit extending lengthwise to allow the rolling element to make rolling contact with the first raceway surface of the shaft, a return groove extending in parallel with the raceway groove, and a pair of turnaround grooves to communicate the raceway groove with the return groove at an end of the retainer;

wherein the second outside circular surface of the retainer has an outside circular groove extending lengthwise across overall length and further has a first projection extending outwards from the circular groove at opposite ends of the outside circular groove;

wherein the second inside circular surface of the end ring has a plurality of arched inside circular grooves extending in lengthwise direction and a second projection lying midway the circular groove and extending inwards from the inside circular groove; and wherein after the outer sleeve has fit into the retainer to keep the outer sleeve and the retainer, the end rings are kept circumferentially in position against the retainer while the retainer is kept against movement in lengthwise direction against the outer sleeve, the end rings are positioned circumferentially against the retainer and the retainer is in the lengthwise direction against the outer sleeve.

The outer sleeve is formed in a polygonal contour which has more than one first flat surface having more than one a first circular surface which is provided thereon with a second raceway surface, and has the first curved surfaces of the first corners having the return passages. Moreover, the retainer has the polygonal second outer circular surface similar with the outer sleeve. The retainer is composed of a second flat surface lying in parallel with the first inside circular surface of the outer sleeve and a second arched surface of a second corner lying between the second flat surfaces. The outside groove is formed along the lengthwise direction of the second arched surface of the retainer.

The inside circular groove in the end ring has a third arched surface to fit over the second corner of the retainer. Moreover, the third curved surface to form the inside circular groove of the end ring extends lengthwise with a width extending up to a middle area of an aria corresponding to the second flat surface of the retainer, with centering an a middle of an area corresponding to the second corner of the retainer. In addition, the third arched surfaces of the adjacent inside circular grooves merge together at a middle of an area corresponding to the second flat surface of the retainer and extend to form a ridge extending inwardly.

The third arched surfaces of the end rings cooperate with the turnaround passages grooves to form the turnaround passages to intercommunicate a raceway defined between the raceway groove of the retainer and the first flat surface of the outer sleeve with a return passage defined between the return groove of the retainer and the first arched surface of the first arched surface of the outer sleeve. The outer circular groove has a trapezoid in transverse section. The tapered guide groove is to locate circumferentially a second raised portion of the end ring with respect to the retainer is provided at the groove end of the first projection formed in the outside circular groove. The second projections of the end rings cooperate with the retainer to experience elastic deformation to get over the first raised portion along the tapered guide groove to fit into the outside groove to fit into the outside circular groove. Moreover, the second projections in the end rings is the middle in the longitudinal direction of the end rings and the third arched surface of the end ring is in symmetry with respect to the center of the raceway groove of the retainer.

The end ring is allowed to fit over either of ends of the retainer and the second projections are allowed to move lengthwise from one end to another end of the retainer under the guidance of the outer circular groove. Moreover, the opposite ends of the retainer have lengthwise holes to accommodate an inspecting member to determine number of balls charged in the circulating groove. The holes are made at locations corresponding to the center of the raceway groove in the circulating groove. The outer sleeve has polygonal configuration in which the first outside circular surface is similar with the polygonal shape of the first inside circular surface. The first outside surface of a uniform thickness and the outer sleeve of quadrant configuration in transverse section is defined with four flat side surfaces and four corners lying between the flat side surfaces.

Effect of the Invention

With the linear bushing constructed as stated earlier, the outer sleeve simple in construction makes it easier to fit accurately the retainer with the end rings attached to the opposite ends of the retainer into the sleeve. Thus, the assembly procedure of the outer sleeve over the retainer with the end rings may be carried out easier to realize the reduction of production cost. The outside circular surface of the retainer has grooves extending over the overall length thereof to make it easier to assemble and fasten the retainer to the outer sleeve with realizing the cost saving of the linear bushing. The outside circular surface of the retainer has grooves extending across the overall length of the end ring. The end ring after assembled in the retainer is kept against the rotational direction of the retainer. The retainer with end rings is allowed to move lengthwise direction along the outside grooves in the situation where the end rings fit over the retainer but there is no outside sleeve. However, after there has been interposed the outer sleeve between the end rings, the outer sleeve may be kept with ease in axial location relatively to the retainer. Moreover, there is no limitation in the direction to assemble the end rings with the retainer. Moreover, the inside circular surface of the end ring has the arched surfaces of the inside circular grooves to ensure the close engagement with the outer circular surface of the retainer to make easier the assembly of the retainer with the end rings. This construction is help increase the freedom of assembly and makes it possible to realize the mass production using automatic assembling machine.

DETAILED DESCRIPTION OF THE PREFERRED EMBODIMENTS

Figure 1:
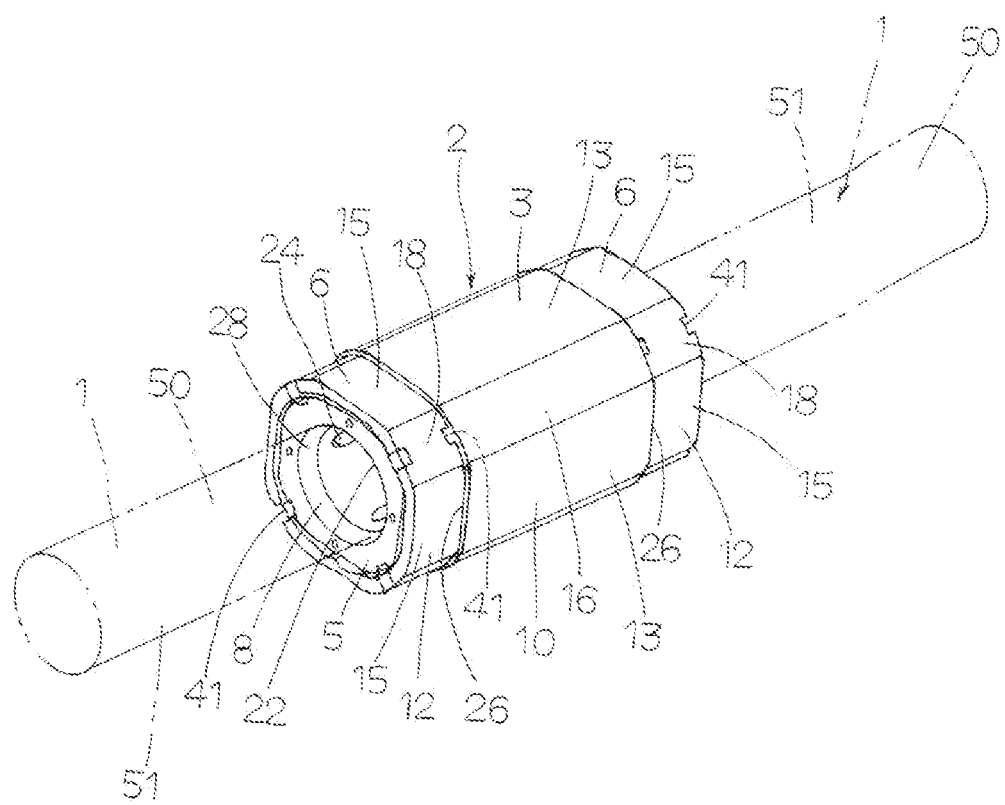
FIG. 1 is a view in perspective showing a preferred embodiment of a linear bushing according to the present invention.

The linear bushing constructed according to the present invention is well adapted for use in machinery as diverse as assembling machines, processing machines, measurement instruments, and so on.

Embodiments of the linear bushing of the present invention will be explained with reference to the accompanying drawings. The linear bushing of the present invention, as generally shown in FIGS. 1 to 6, is mainly composed of an elongated round shaft 1 of circular configuration in transverse section having a first circular outside surface 50 and first raceway surfaces 51, and a slider 2 which fits over the shaft 1 for lengthwise movement relatively to the shaft 1 through more than one rolling element or ball 4 (refer to FIG. 1). The slider 2 comprises of an outer sleeve 3 of one-piece polygonal construction (substantially rectangular shape in this embodiment) made of thin steel sheet, a retainer 5 of one-piece polygonal construction (substantially rectangular shape in this embodiment) having an outer circular surface 11 (second outer surface) which, after having fit into an inside circular surface of an opening 55 of the outer sleeve 3, forms a circular groove to define a circulating circuit of the retainer, a pair of end rings 6 of polygonal construction (substantially rectangular shape in this embodiment) each of which fits over each of opposite ends 28 of the retainer 5 extending out of the opposite end surfaces 26 of the outer sleeve 3, and more than one ball 4 coming into rolling contact with both an outside circular surface 50 around the shaft 1 and a raceway surface 52 inside the outer sleeve 3 through slits 27 to roll through circulating grooves 22 while kept in the retainer 5 (refer to FIG. 2).

Figure 3:
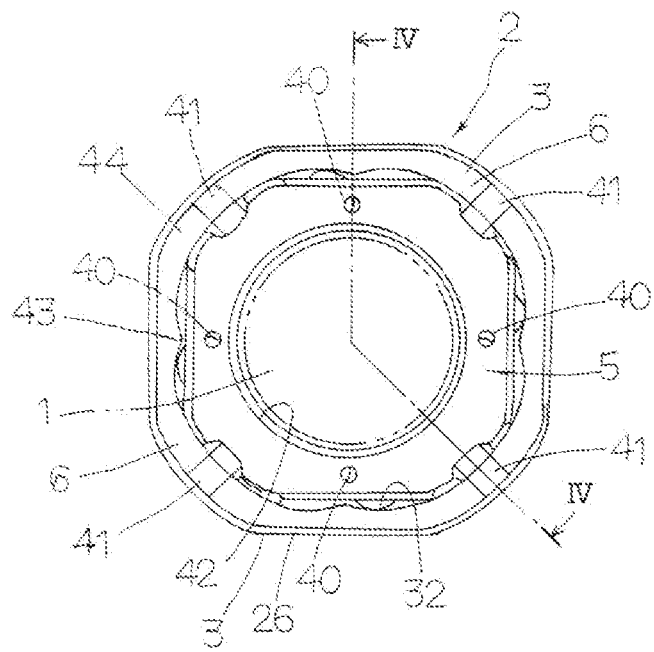
FIG. 3 is a view in front elevation of the linear bushing of FIG. 1, the view being taken on an end position of a slider.

The shaft 1 extends through an axial opening 42 of the retainer 5 and openings 43 of the end rings 6 (refer to FIG. 3). The shaft 1 has a diametral dimension of φ6 mm. Moreover, the slider 2 has a contour of substantially rectangular solid defined with circular arc surfaces and flat surfaces. The outer sleeve 3 is composed of outside surfaces 10 and inside surface 7 combined together to form an opening of substantially rectangular contour (refer to FIG. 25). The retainer 5 has outside surfaces or second outside surfaces 11 combined together to form a substantially square configuration, and an inside circular surface 8 composed of inside concaves 32 to define an aperture of opening 42 of substantially circular shape to allow the shaft 1 to extend through there (refer to FIG. 9). Each end ring 6 has an outside circular surface 12 of substantially square configuration in transverse section. The end ring 6 has an outside circular surface 12 of substantially a contour in transverse section. Moreover, the end ring 6 has an inside circular surface 9 made with inside concaves 32 to make openings 43 of substantially circular shape to fit snugly over the retainer 5. On axially end surfaces 44, there are made recesses 41 which serve as ports to treat gates used at the time of molding process of the end ring 6. The recesses 41 are made circumferentially spaced away from each other (refer to FIG. 19). As the end ring 6 has a substantially square configuration in transverse section, the inside concaves 32 in the end ring 6 are made from curved surfaces or third concaves 36 each of which is formed centered on corners 18 or third corners in correspondence with the corners 17 of the retainer 5. The outside circular surface 12 of the end ring 6 is defined with four concaves 21 of corners 18 and substantially square flat surfaces 15 lying between any two concaves 21. With the end ring 6 constructed as stated earlier, the concave 36 of the inside circular surface 9 and the concave 21 of the outside circular surface 12 have centers coincident with each other.

Figure 2:
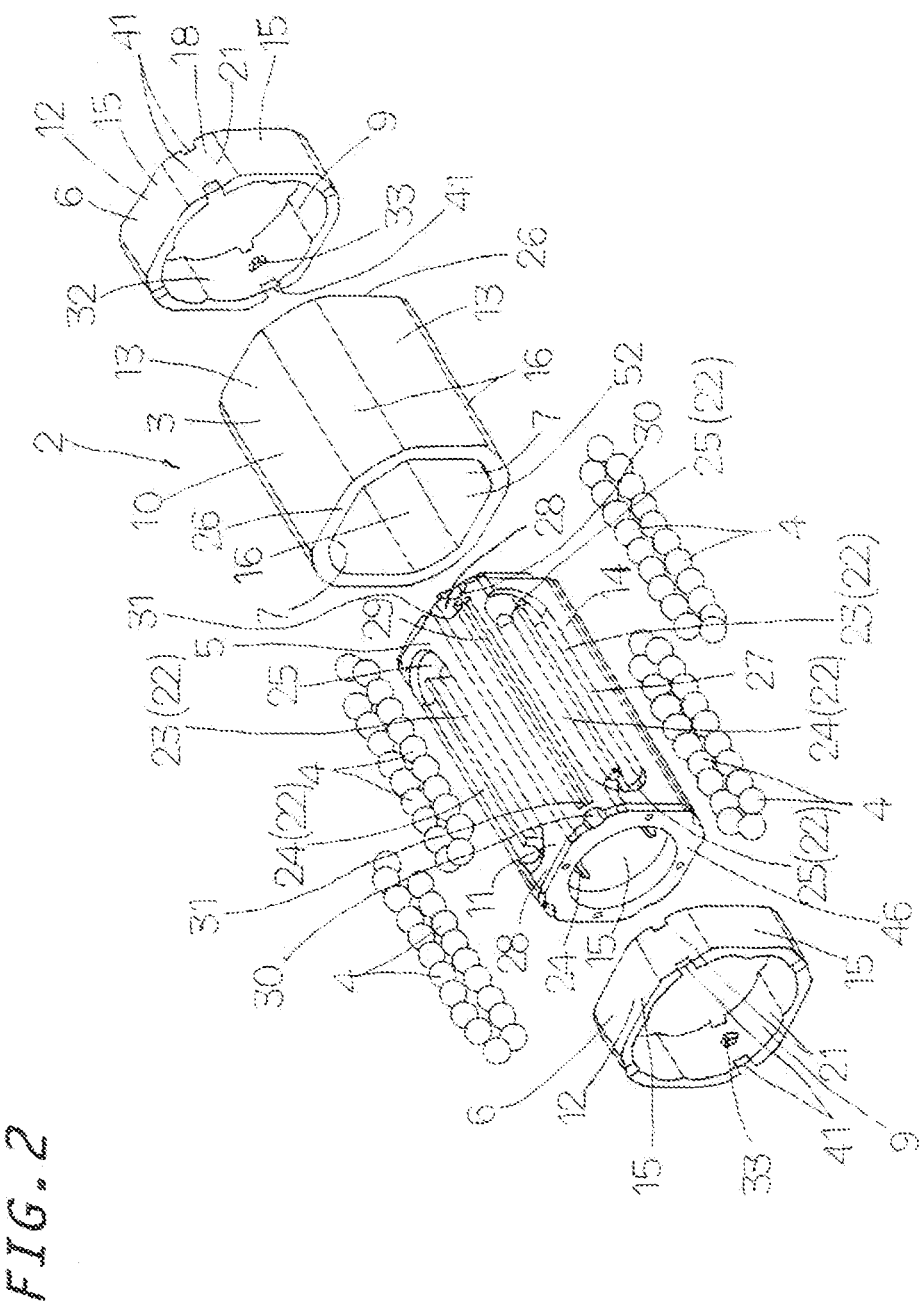
FIG. 2 is an exploded view in perspective of the linear bushing of FIG. 1.

The slider 2, as shown in FIG. 2, is mainly constituted with the outer sleeve 3, retainer 5 and the end rings 6, each of which has the polygonal contour, especially substantially square configuration. The slider 2 has four rows of circulating circuits therein. More especially, the slider 2 has the quadrant shape of 11 mm in transverse section and 19 mm in length. More especially, the slider 2 is composed of the metallic outer sleeve 3, synthetic resin-made retainer 5, synthetic resin-made end rings 6 and more than one rolling elements or ball 4. The outer sleeve 3 is 12 mm in overall length, the retainer 5, 18.8 mm in overall length. The end ring 6 is 3.5 mm in overall length and the outer sleeve 3 is about 1 mm in thickness. The circulating circuit is constituted with a race 34, return passage 35 and turnaround passages 38. The race 34 is defined with a flat surface 13 on the inside circular surface 7 of the outer sleeve 3 and a flat surface or second flat surface 14 on the inside circular surface 8 of the retainer 5 (refer to FIG. 5). Moreover, the return passage 35 is constituted with an arced surface 19 to provide a return passage surface 53 at a corner 16 of the inside circular surface 7 of the outer sleeve 3 and a second arced surface 20 at a corner 17 of the inside circular surface 8 of the retainer 5 (refer to FIG. 5). The turnaround passage 38 is defined between the inside curved surface 36 of the inside circular surface 9 of the end ring 6 and a turnaround groove 25 (refer to FIG. 6).

Figure 25:
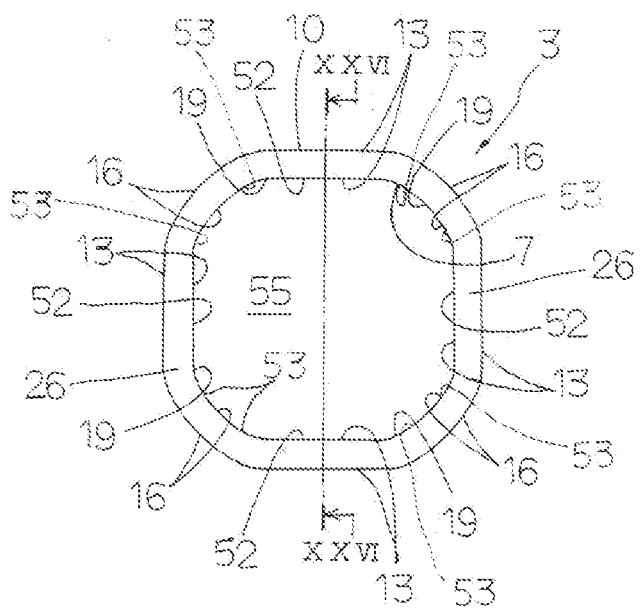
FIG. 25 is a view in front elevation showing an outer sleeve of the linear bushing of FIG. 1.
Figure 26:
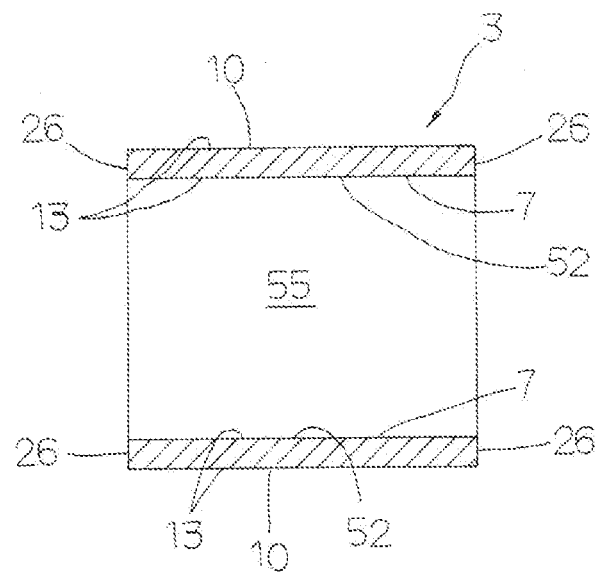
FIG. 26 is an enlarged view in longitudinal section of the outer sleeve, the view being taken on the plane of the line XXVI-XXVI of FIG. 25.

With the linear bushing constructed as stated earlier, the outer sleeve 3 as shown in FIG. 25 has polygonal configuration which is defined with an outside surface 10 and an inside surface 7 which are spaced from each other to provide a uniform thickness between them. The outer sleeve 3 of quadrant configuration in transverse section is defined with four flat surfaces 13 and four corners 16 lying between the flat surfaces 13. The flat surfaces 13 on the inside surface 7 thereof have the raceway surface 52 extending lengthwise of the outer sleeve 3 to allow more than one rolling element 4 to roll through there. The four corners 16 have the return passages 53. The outer sleeve 3 is made of thin steel sheet which is first subjected to the press-molding. The press-molded outer sleeve 3 after subjected to the carbonizing treatment is subjected to hardening and tempering and further subjected to barrel polishing. Moreover, the retainer 5 as shown in FIGS. 9 to 18 has flat surfaces 14 and arched surfaces 20 which are made in the rectangular shape similar with the inside circular surface 7 of the outer sleeve 3. The retainer 5 has the outside circular surfaces 11 made with four rows of circulating grooves 22 to allow the balls 4 to roll through there and the inside circular surfaces 8 to fit over the shaft 1. The retainer 5 further has opposite ends 28 which extend out of lengthwise opposite end surfaces 26 of the outer sleeve 3 after the retainer 5 has fit into the outer sleeve 3. In addition, the retainer 5 at four corners on end faces 46 has recesses 17 which serve as ports to treat gates used at the time of molding process of the retainer 5 (refer to FIG. 11).

Figure 17:
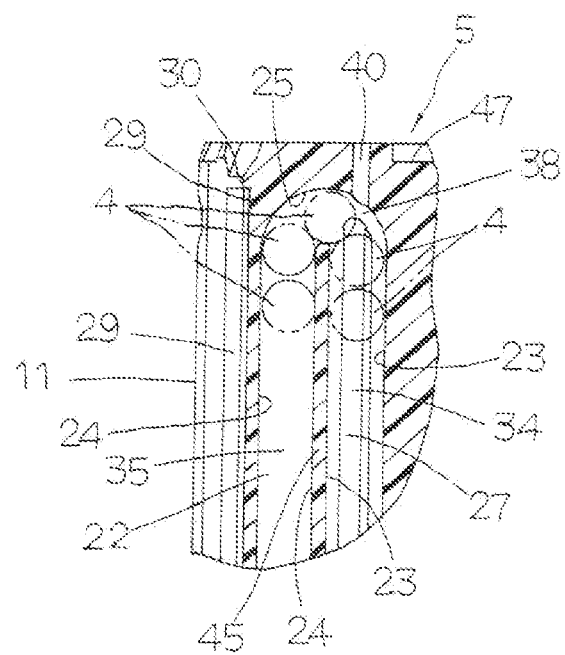
FIG. 17 is a fragmentary view in transverse section of the retainer, the view being taken on the plane of the line XVII-XVII of FIG. 16.
Figure 18:
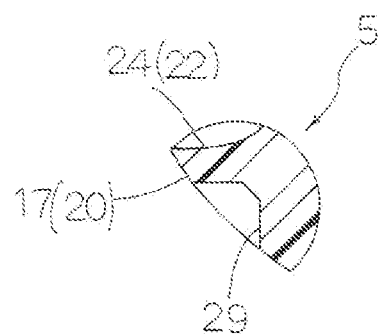
FIG. 18 is an enlarged fragmentary view in transverse section to show an area encircled with a sign XVIII in FIG. 16.

The circulating groove 22 made in the retainer 5 as shown in FIG. 17 extends lengthwise along the corner 17 lying a boundary between the flat surface 14 and one of the arched surfaces 20 to communicate with the end 28 of the retainer 5 so as to allow the balls 4 to recirculate in a circuit manner. The circulating groove 22 in the retainer 5 is designed to get the balls 4 in the turnaround passage 38 recirculating in such a manner scooping up the balls 4 towards outer sleeve 3. With the linear bushing of the present invention, the raceway groove 23 and the return groove 24 to constitute the circulating groove 22 are separated from each other by means of a lengthwise partition wall 45. Moreover, the circulating groove 22 is composed of the raceway groove 23 having lengthwise slits 27 to allow the balls 4 to make rolling contact with the raceway surface 51 of the shaft 1 along lengthwise flat surface 14 of the retainer 5, the return groove 24 extending lengthwise along the corner 17 in parallel with the raceway groove 23, and a pair of turnaround grooves 25 to communicate the raceway groove 23 with the return groove 24 at the end 28 of the retainer 5. With the linear bushing constructed as stated earlier, the retainer 5 on the outer surface thereof has a groove 29 of trapezoid in transverse section extending at the corner 17 lengthwise of the retainer 5, the groove 29 being used to locate circumferentially the outer sleeve 3 with respect to the retainer 5. On opposite groove ends 31 of the groove 29, first projections 30 are made to extend outside of the groove 29 (refer to FIGS. 10 and 13).

Figure 4:
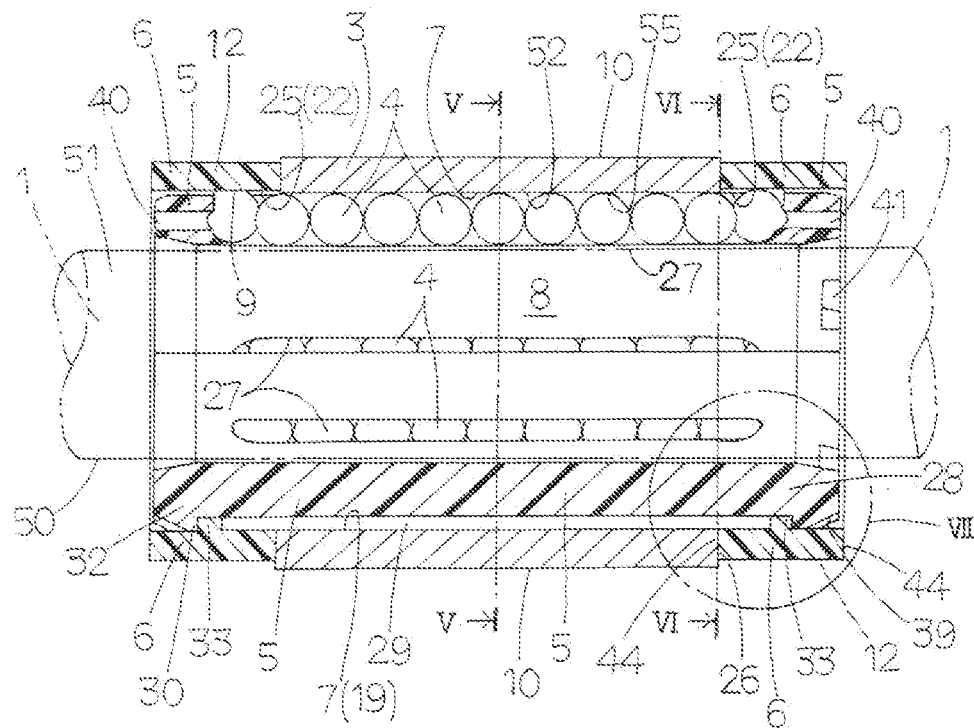
FIG. 4 is a view in longitudinal section of the linear bushing, the view being taken on the plane of the line IV-IV of FIG. 3 to show in detail a slider which has fit over a shaft.
Figure 5:
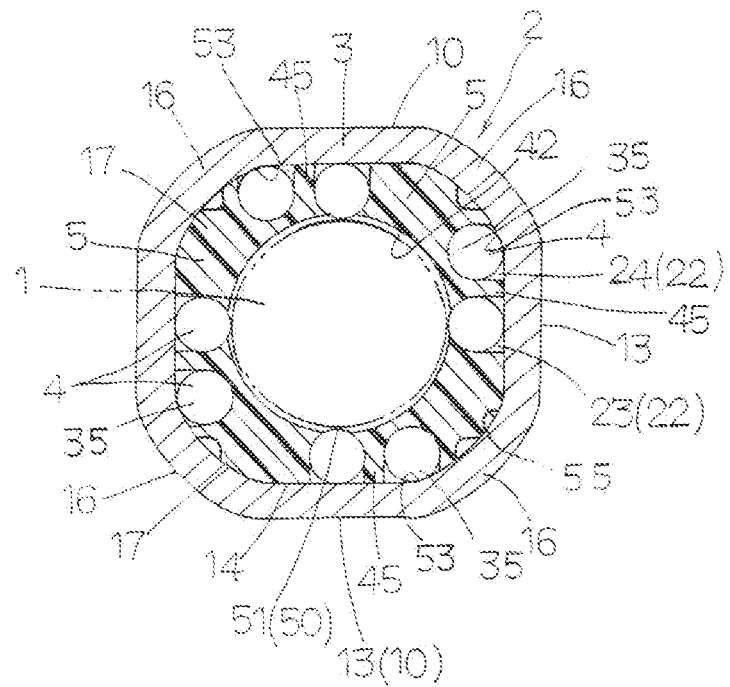
FIG. 5 is a view in transverse section of the linear bushing, the view being taken on the plane of the line V-V of FIG. 4 to show in detail the slider which has fit over a shaft.
Figure 6:
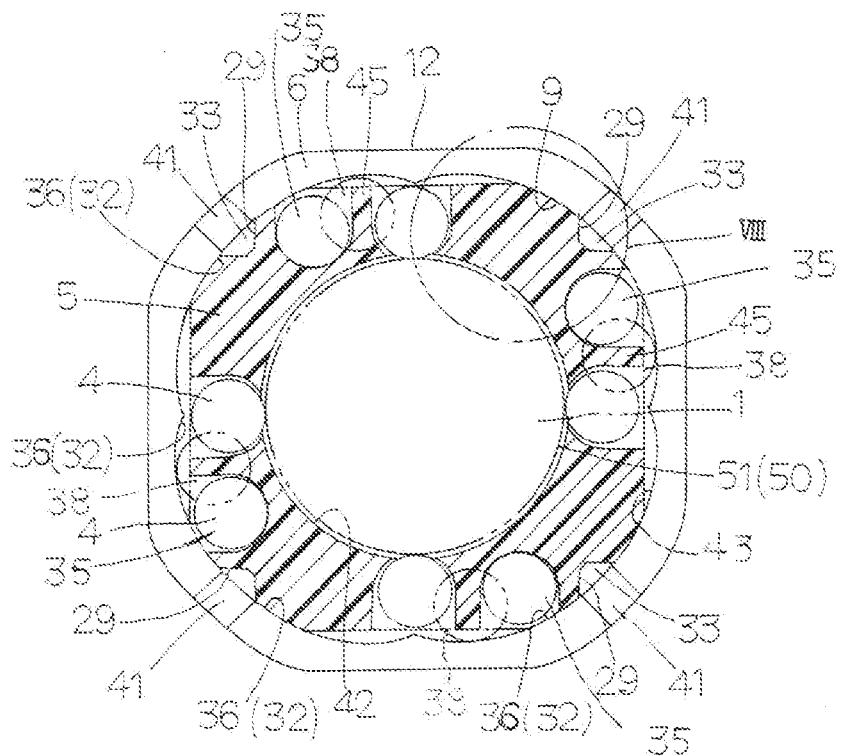
FIG. 6 is a view in transverse section of the linear bushing of FIG. 4, the view being taken on the plane of the line VI-VI of FIG. 4 to show in detail the slider which has fit over a shaft.
Figure 7:
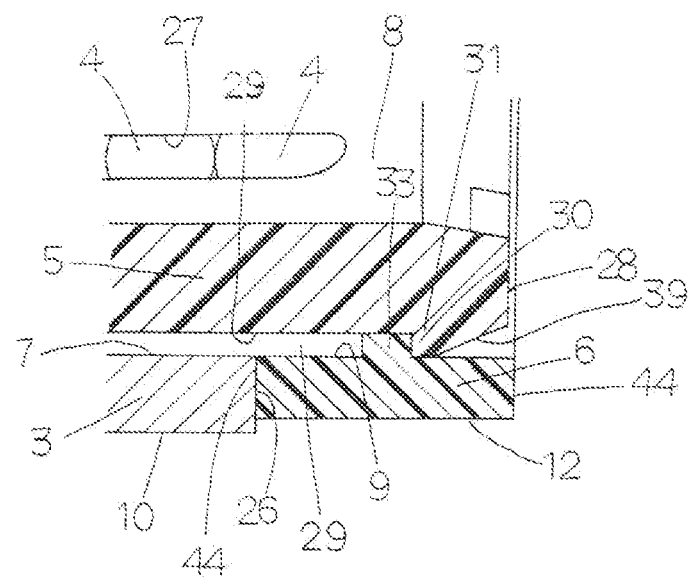
FIG. 7 is an enlarged view in transverse section showing an area encircled with a sign VII in FIG. 4 of the slider, the view illustrating the engagement of the retainer with an end ring in the slider.
Figure 8:
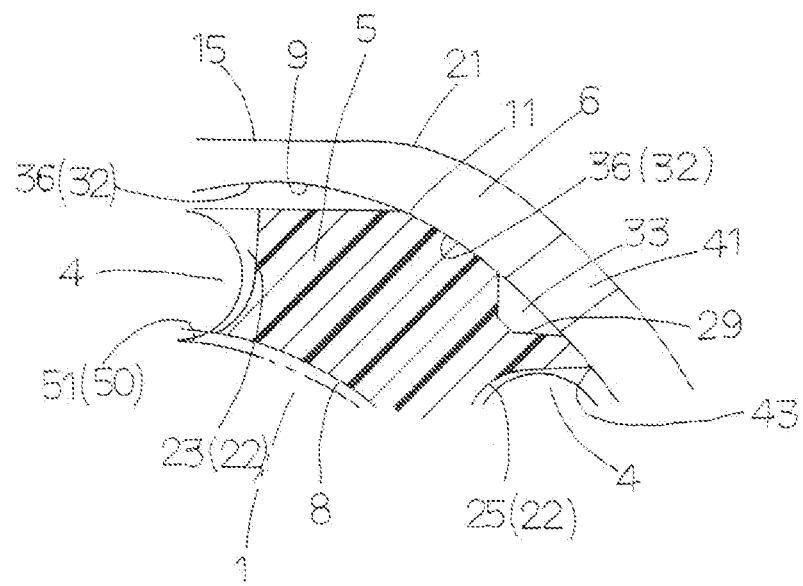
FIG. 8 is an enlarged view in transverse section showing an area encircled with a sign VIII in FIG. 6 of the slider, the view illustrating the coupled relation between the retainer and the end ring in the slider.
Figure 19:
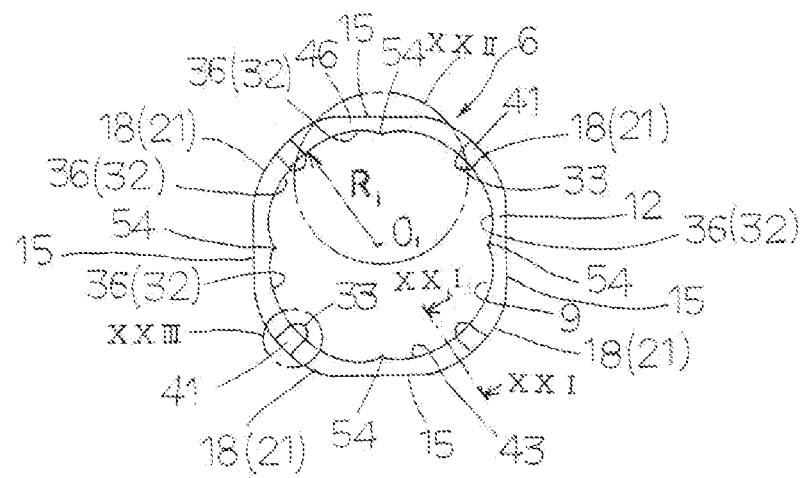
FIG. 19 is a view in front elevation showing an end ring to constitute the linear bushing of FIG. 1.
Figure 20:
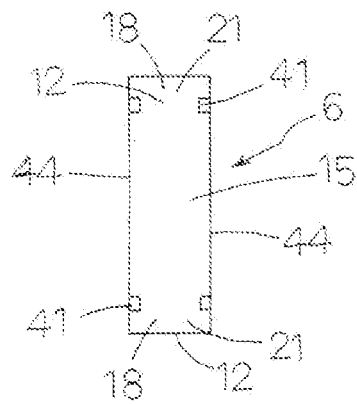
FIG. 20 is a view in side elevation of the end ring of FIG. 19.
Figure 21:
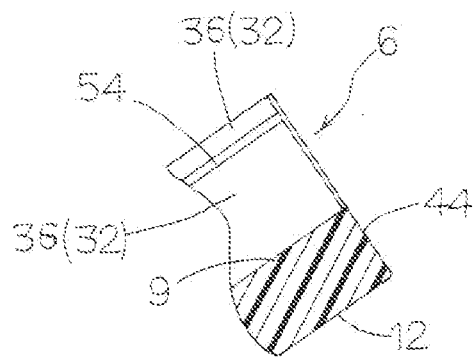
FIG. 21 is a view in transverse section of the end ring taken on the line XXI-XXI of FIG. 19.
Figure 22:
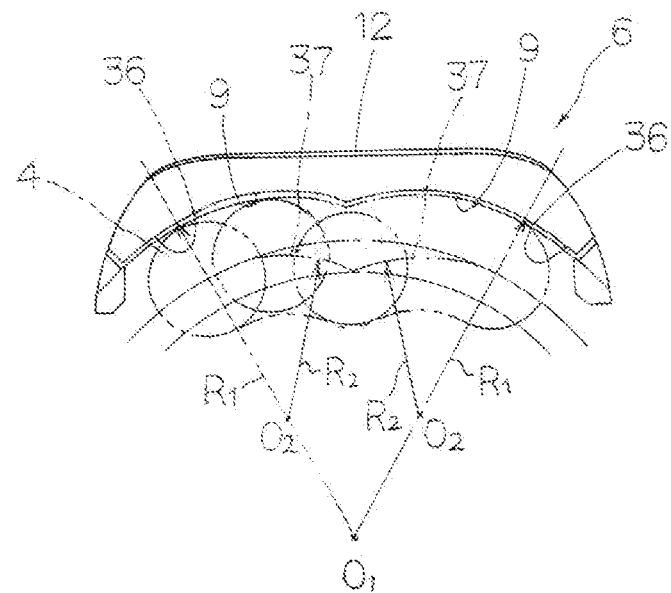
FIG. 22 is an enlarged explanatory view to show the end ring at an area encircled with a sign XXII in FIG. 19.

The end ring 6 as shown in FIG. 4 is lengthwise inserted or advanced from one of the ends 28 of retainer 5 into the retainer 5 till a lug or second projection 33 makes engagement with the groove 29 on the outside circular surface of the retainer 5 to keep the end ring 6 against rotation of the retainer 5. Moreover, the end ring 6 having the shaft 1 therein after having come into abutment against the end surfaces 26 of the outer sleeve 3 is kept against retainer 5 in the lengthwise direction of the retainer 5. The inside circular surface 9 of the end ring 6 as shown in FIGS. 19 and 22 has a combined configuration of four inside circular surfaces 9. The end ring 6 has the inside concaves 32 which lengthwise extends along the corner 18 of the inside circular surface 9 in opposition to the corner 17 of the retainer 5 across a width lying between the middle of the corner and the middle of the between flat surface 15. The projections 33 of raised portions extend inwardly at the widthwise middle area of the inside concaves 32. More especially, the inside concave 32 in the end ring 6 has the inside curved surfaces 36 which fit over the corners 17 of the retainer 5. The inside curved surfaces 36 includes a zone corresponding to the turnaround groove 25 of the retainer 5 and another zone to fit over the corner 17 of the retainer 5. The projections 33 formed in the inside concaves 32 are made at the middle of the inside curved surfaces 36 to fit into the corner 17.

In FIG. 22 showing the inside concave 32 in the end ring 6, moreover, there is illustrated radius of curvature R1 of a locus of the center of the ball 4 rolling through the turnaround passage 38. The radius of curvature R2 of a locus of the center of the ball 4 has the center 02 lying midway radius of curvature R1 of a locus 37 of the center of the ball 4. More especially, the radius of curvature R2 of a locus of the center of the ball 4 resides on a line of the radius of curvature R1 extending from the center 01 of the radius of curvature R1 to the inside curved surface. The radius of curvature R1 of the curved surface 36 formed on the end ring 6 is made larger than the radius of curvature R2 of a locus of the center of the ball 4, that is, R1>R2.

With the slider 2 in the linear bushing constructed as stated earlier, the retainer 5 fits in the outer sleeve 3 in such a way kept against rotation relative to the outer sleeve 3. The end rings 6 fit over the opposite ends of the retainer 5 to make engagement between the first projections 30 and the second projections 33 to keep the retainer 5 against rotation relative to the end rings 6. Further, the end rings 6 fit over the opposite ends 28 of the retainer 5 through the outer sleeve 3 to keep the end rings 6 and the outer sleeve 3 against longitudinal movement relative to the retainer 5.

Figure 23:
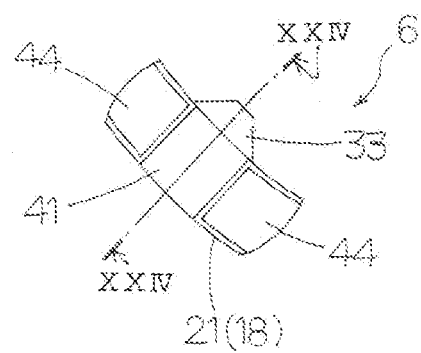
FIG. 23 is an enlarged fragmentary view of the end ring, showing an area encircled with a sign XXIII in FIG. 19.
Figure 24:
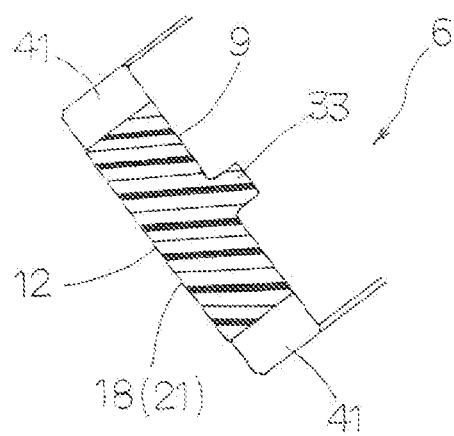
FIG. 24 is an enlarged fragmentary view of the end ring, the view being taken on the plane of the line XXIV-XXIV of FIG. 23.

With the linear bushing of the present invention, the end ring 6 as shown in FIGS. 23 and 24 has the lug or second projection 33 which extends lengthwise along the middle of the inside curved surfaces 36 in opposition to the outside groove 29 of the retainer 5. The inside curved surfaces 36 are arranged in pair in bilateral symmetry with respect to the middle location of the raceway grooves 23 of the retainer 5. The end ring 6 is made to fit over either of the ends 28 of the retainer 5. The end rings 6 upon assembly thereof are allowed to fit over the retainer 5 without afraid of directions of linear movement and rotation. With the linear bushing constructed as stated earlier, the balls 4 in the circulating circuit are scooped out towards the outer sleeve 3 and guided into the turnaround passage 38 defined between the turnaround groove 25 in the circulating groove 22 and the inside concave 32 of the inside circular surface 9 in the end ring 6. In the linear bushing of the present invention, the balls 4 while rolling through the turnaround passage 38 are guided with the wall defining the turnaround groove 25 in the retainer 5 and the inside curved surface 36 of the inside circular surface 9 in the end ring 6 (refer to FIG. 2). The inside curved surfaces 36 adjacent to each other in the end ring 6 merge together at an area corresponding with the middle of the flat surface 15 in the outside circular surface 12 of the end ring 6, thereby making a ridge 54 extending to the area of the flat surface 14. Moreover, the inside curved surfaces 36 of the end ring 6 works together with the turnaround groove 25 of the retainer 5 to make the turnaround passage 38 communicating between the race 34 which is composed of the raceway grooves 23 of the retainer 5 and the flat surface 13 of the outer sleeve 3 and the return passage 35 which is composed of the return groove 24 of the retainer 5 and the arched surface 19 of the outer sleeve 3.

Figure 10:
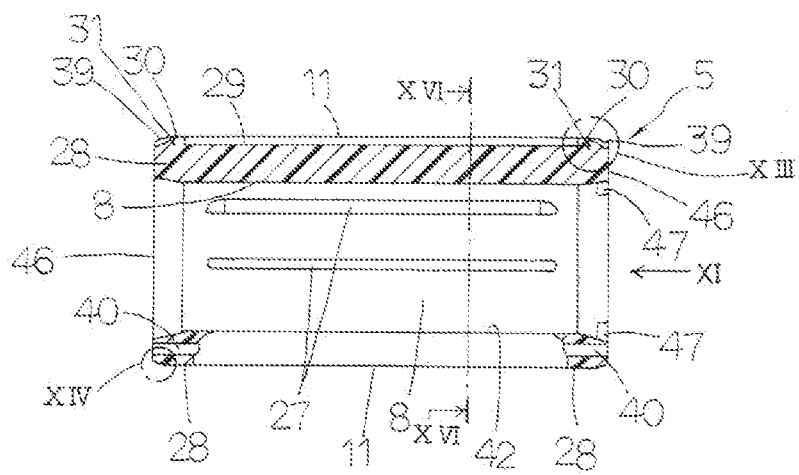
FIG. 10 is a view in longitudinal section of the retainer, the view being taken on the plane of the line X-X of FIG. 9.
Figure 11:
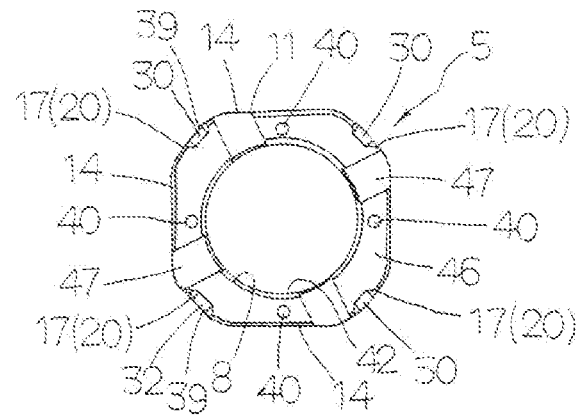
FIG. 11 is a view in rear elevation of the retainer, looked from the direction XI in FIG. 10.
Figure 12:
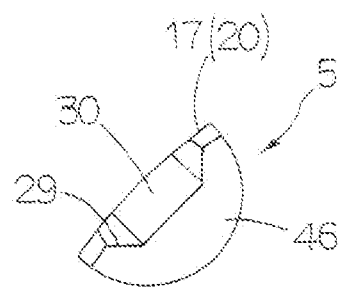
FIG. 12 is an enlarged view in front elevation of the retainer to show an area encircled with a sign XII in FIG. 9.
Figure 13:
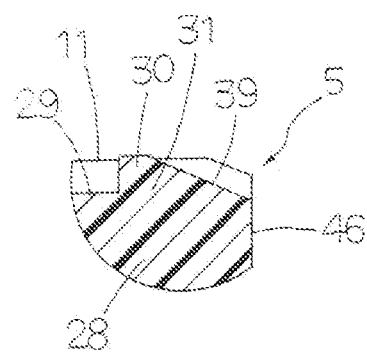
FIG. 13 is an enlarged view in side elevation of the retainer to show an area encircled with a sign XIII in FIG. 10.
Figure 14:
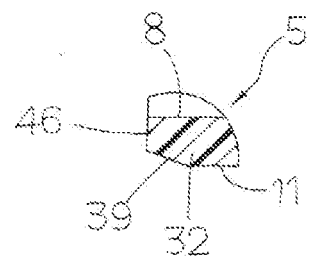
FIG. 14 is an enlarged view in side elevation of the retainer to show an area encircled with a sign XIV in FIG. 10.
Figure 15:
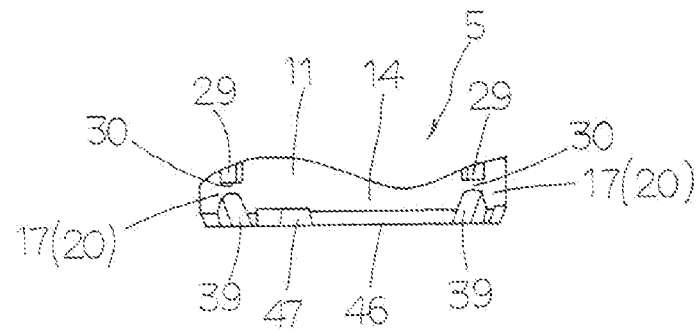
FIG. 15 is a view in side elevation of an outside peripheral surface on an end side of the retainer of FIG. 10.
Figure 16:
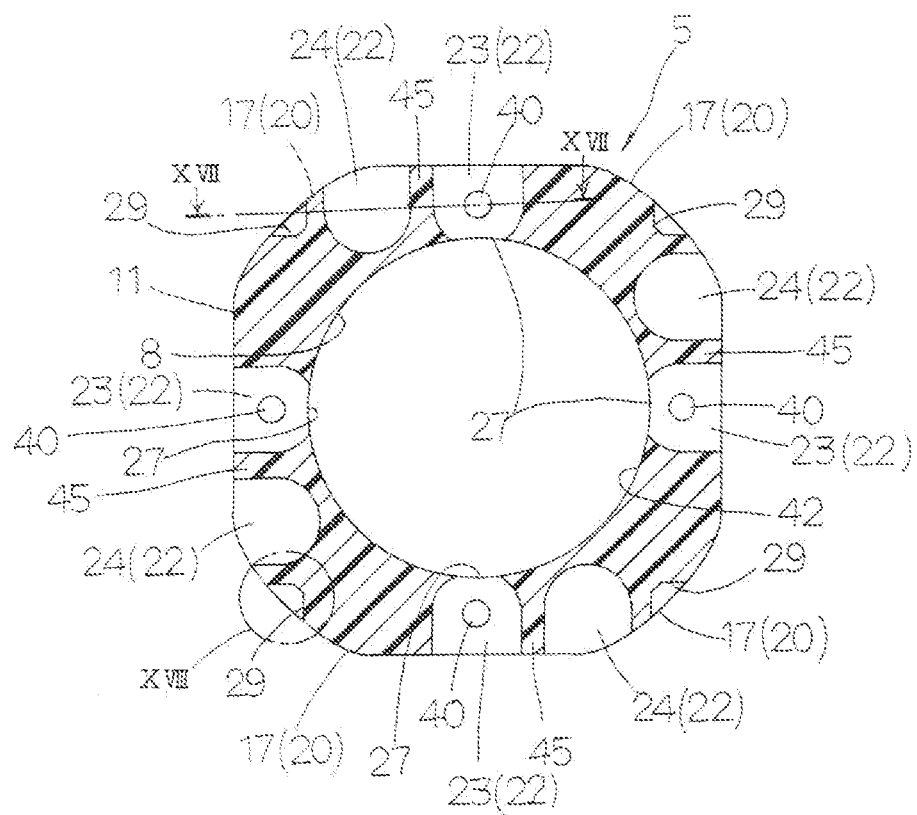
FIG. 16 is a view in transverse section of the retainer, the view being taken on the plane of the line XVI-XVI of FIG. 10.

With the linear bushing of the present invention, moreover, the outside groove 29 made at the corner 17 of the retainer 5 has a trapezoid in transverse section (refer to FIG. 16). A groove end 31 on the projection 30 formed in the raised end in the groove end 31 of the outside groove 29 has a tapered guide groove 39 to locate circumferentially the raised projections 33 of the end ring 6 with respect to the retainer 5 (refer to FIGS. 10 and 13). The tapered guide groove 39 inclines at 25 degrees with respect to the outside circular surfaces 11 of the retainer 5. The outside groove 29 is made to extend across the overall length between the lengthwise opposite raised portions 33. The raised portions 33 on the end rings 6, when subjected to the elastic deformation under cooperation with the retainer 5, get over the raised portion (projection) 30 along the tapered guide groove 39 to fit into the outside groove 29. The cut recesses 47 at the end faces 46 of the retainer 5 serves as ports to treat gates used at the time of molding process of the retainer 5 (FIG. 11). The groove 29 extending lengthwise across retainer 5 makes it possible to fit the end rings 6 from either end of the retainer 5.

Figure 9:
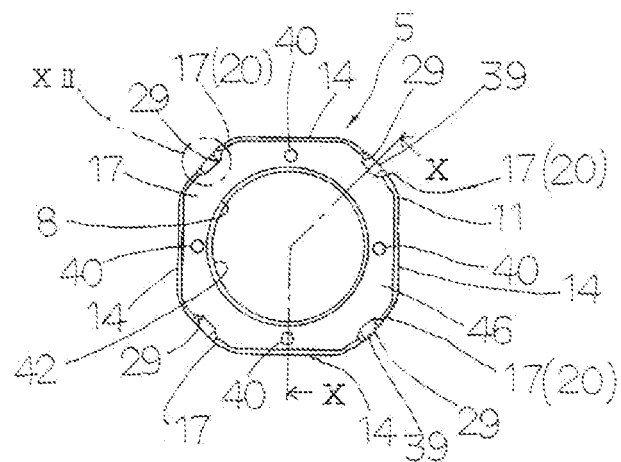
FIG. 9 is a view in front elevation of the retainer to provide the linear bushing of FIG. 1.

In the opposite ends 28 of the retainer 5, lengthwise holes 40 to inspect and determine the number of balls 4 charged in the circulating groove 22 are made at locations corresponding to the center of the raceway groove 23 in the circulating groove 22 (FIGS. 9 and 11). More especially, the lengthwise holes 40 are made in end faces 46 of the retainer 5 to communicate with the turnaround passages 38 (FIGS. 10 and 17). The lengthwise holes 40 in the retainer 5 are made at locations which are on extensions of the races 34 formed on the four flat surfaces 14 of the opposite end faces 46. Each of the lengthwise holes has a diameter of $\phi 0.5$ mm and configuration of round or stepped hole. The axial opening 42 of the retainer 5 to fit over the shaft 1 has a size of for example $\phi 6.2$ mm. Moreover, the axial opening 42 in the retainer 5 is defined with a tapered inside circular surface to make it easier to insert the shaft 1 into the retainer 5 (refer to FIG. 10).

Figure 27:
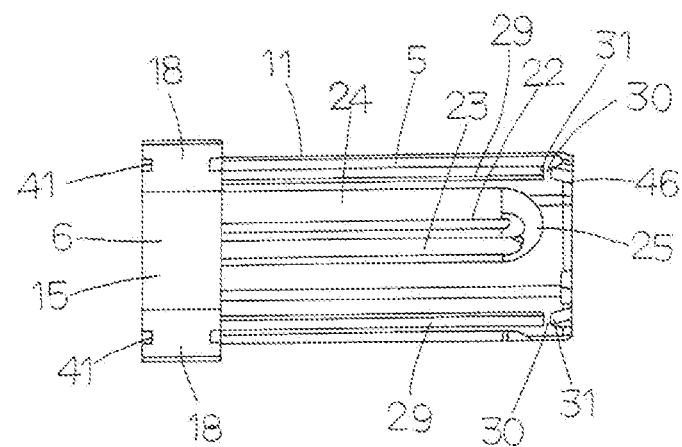
FIG. 27 is a schematic view explaining how one of the end rings is fit over the retainer to assemble the slider of the linear bushing of FIG. 1.
Figure 28:
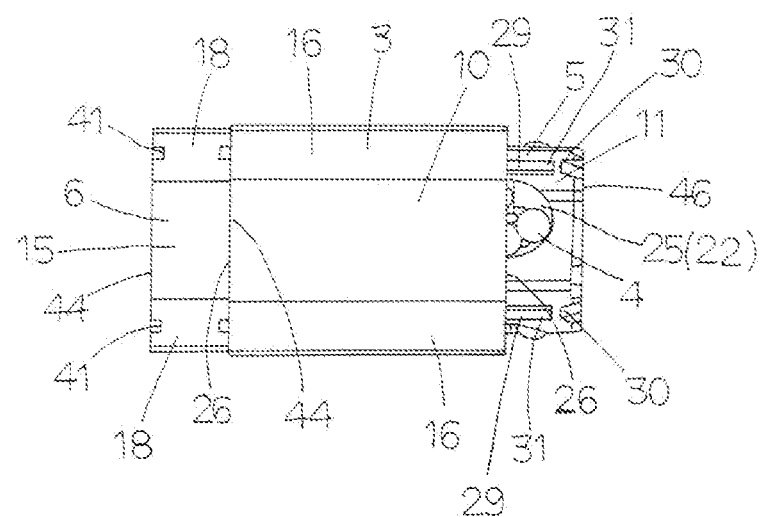
FIG. 28 is a schematic view explaining a phase in which an outer sleeve has fit over the retainer after the assemblage of the slider shown in FIG. 27.
Figure 29:
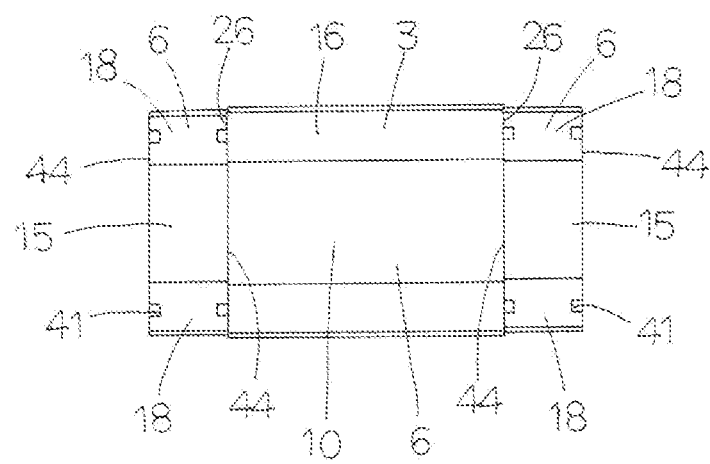
FIG. 29 is a schematic view explaining a phase in which another outer sleeve has fit over the retainer after the assemblage of the slider shown in FIG. 28.

With the linear bushing of the present invention, the outer sleeve 3, retainer 5 and the end rings 6 are assembled as stated later. The retainer 5 has the outside groove 29 extending across the overall length thereof, and further has the projections 33 at the opposite groove ends 31 of the outside groove 29, so that the outside groove 29 extends lengthwise between the projections 33 lying at the opposite groove ends 31 of the outside groove 29. With retainer 5 constructed as stated earlier, each of the end rings 6 is allowed to fit over respective end 28 of the retainer 5. How the outer sleeve 3, retainer 5 and the end rings 6 are assembled to complete the linear bushing of the present invention will be explained hereinafter with reference to FIGS. 27 to 29. First, one of the end rings 6 as shown in FIG. 27 is fitted over one end 28 of the retainer 5 and then the outer sleeve 3 as shown in FIG. 28 is fitted over retainer 5 from another end of the retainer 5. As an alternative, the outer sleeve 3 is allowed to fit over retainer 5 from the same end 28 of the retainer 5. To this end, it is sufficient to only move the end ring 6 together with the retainer 5 towards another end 28 of the retainer 5. After the end rings 6 and the outer sleeve 3 have been assembled with the retainer 5, a required number of balls 4 is charged into the circulating groove 22 from the turnaround groove 25 of the retainer 5 exposed outside of the outer sleeve 3. After the required number of balls 4 has been inserted into the circulating groove 22, the end ring 6 as shown in FIG. 29 fits over another end 28 of the retainer 5 to complete assembly of the linear bushing.

Figure 30:
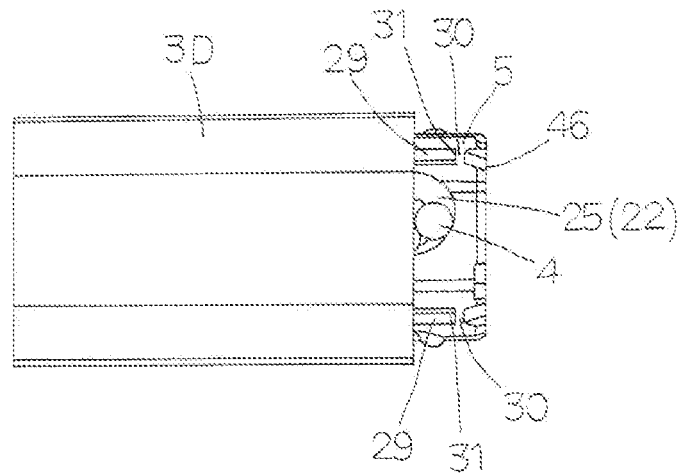
FIG. 30 is a schematic view explaining a phase in which a dummy outer sleeve fits over the retainer in explanation of automatic assemblage to complete the slider in linear the linear bushing of FIG. 1.
Figure 31:
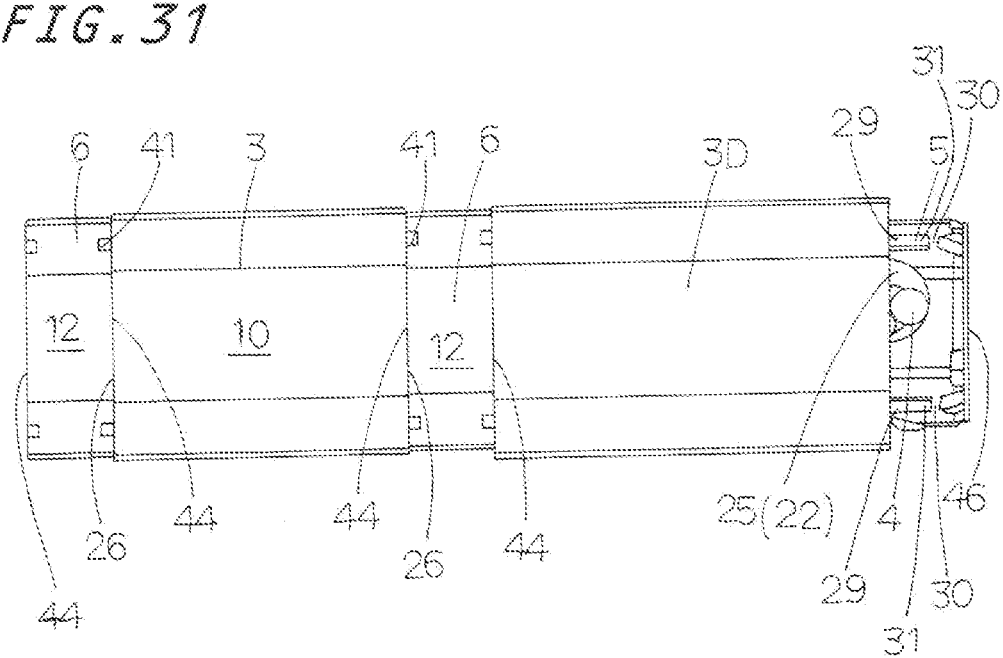
FIG. 31 is an explanatory view to illustrate the phase in which the dummy out sleeve in FIG. 30 is replaced with the assembly of the outer sleeve with end rings lying on opposite ends thereof.

Next, referring FIGS. 30 and 31, there will be explained another version to automatically assemble the outer sleeve 3 and the end rings 6 into linear bushing. A dummy outer sleeve 3D as shown in FIG. 30 is prepared to assemble the linear bushing. The retainer 5 is inserted from one end thereof into the dummy outer sleeve 3D to the extent that the retainer 5 is exposed in part out of the dummy outer sleeve 3D. Then, a proper number of the balls 4 is charged into the circulating groove 22 through the turnaround groove 25 of the retainer 5 exposed out of the dummy outer sleeve 3D. With the linear bushing constructed as stated earlier, as the outside groove 29 in the retainer 5 is made to extend across the overall length between the lengthwise opposite raised portions of groove ends 31, the end ring 6 is allowed to fit over the retainer 5 from one end 28 of the retainer 5. Thus, the end ring 6, outer sleeve 3 and another end ring 6 are in succession assembled into the retainer 5 to complete the liner bushing as shown in FIG. 29.

What is claimed is:

1. A linear bushing having a lengthwise direction and comprising:
   an elongated shaft extending in the lengthwise direction and having a round shape in transverse section and an outside circular surface defining a first raceway surface;
   a slider which fits over the shaft for movement relative to the shaft in a lengthwise direction of the shaft;
   a plurality of rolling elements between said shaft and said slider; and
   a pair of polygonal end rings;
   wherein the slider comprises an outer sleeve having opposite ends, polygonal outside and inside surfaces, the inside surface defining a second raceway surface to allow the rolling elements to run through lengthwise of the slider, and a return passage extending in parallel with the second raceway surface, the slider further comprising a retainer fitted into the outer sleeve, the retainer having a length between opposite ends extending out of opposite ends of the outer sleeve, and the retainer having a polygonal outside surface conforming to the inside surface of the outer sleeve, the polygonal outside surface of the retainer having a plurality of circulating grooves forming a circuit to allow the rolling elements to move in a circulating manner, and the rolling elements are balls rolling through the circulating grooves in the retainer;

wherein each of the end rings fits over a respective end of the retainer to abut against the ends of the outer sleeve so that the end rings cover the respective ends of the retainer;

wherein each of the circulating grooves in the retainer is composed of: a raceway groove having a slit extending lengthwise to allow the rolling elements to make rolling contact with the first raceway surface of the shaft; a return groove extending in parallel with the raceway groove; and a pair of turnaround grooves, each turnaround groove communicating the raceway groove with the return groove at a respective end of the retainer;

wherein the polygonal outside surface of the retainer has an outside groove extending lengthwise along the length of the retainer and further has first projections extending radially outwardly from the outside groove at opposite ends of the outside groove;

wherein each of the end rings has an inside circular surface having a plurality of inside circular grooves, each with an arched surface, extending in the lengthwise direction of the bushing, and second projections lying at midpoints of the circular grooves and extending inwards from the inside circular grooves; and wherein after the outer sleeve is fitted into the retainer to keep the outer sleeve in place relative to the retainer, the end rings are kept circumferentially in position against the retainer while the retainer is kept against movement in the lengthwise direction against the outer sleeve, the end rings are positioned circumferentially against the retainer and the retainer is positioned in the lengthwise direction against the outer sleeve.

2. The linear bushing according to claim 1, wherein the outer sleeve has a polygonal contour composed of a plurality of first flat surfaces alternating with first arched surfaces, and the second raceway surface is defined by at least one of said first flat surfaces.

3. The linear bushing according to claim 2, wherein the polygonal outside surface of the retainer is composed of a plurality of flat surfaces lying in parallel with the polygonal inside surface of the outer sleeve and an arched surface of a corner of the outside surface of the retainer lying between two of the flat surfaces, and the outside groove is formed along the lengthwise direction of the arched surface of the retainer.

4. The linear bushing according to claim 3, wherein each of the inside circular grooves in each of the end rings has an arched surface to fit over the corner of the retainer.

5. The linear bushing according to claim 4, wherein the inside circular groove of each of the end rings extends lengthwise with a width extending up to a middle area of an area corresponding to one of the flat surfaces of the retainer, with centering a middle of an area corresponding to the corner of the retainer, and wherein the corner of the retainer comprises a plurality of corners and the arched surfaces of adjacent inside circular grooves merge together at a middle of an area corresponding to the one of the flat surfaces of the retainer and extend to form a ridge extending inwardly.

6. The linear bushing according to claim 4, wherein one of the first arched surfaces of the end ring cooperates with the turnaround groove of the retainer to provide a turnaround passage to intercommunicate a raceway defined between the raceway groove of the retainer and one of the first flat surfaces of the outer sleeve, with a return passage defined between the return groove at one end of the retainer and the one of the first arched surfaces of the outer sleeve.

7. The linear bushing according to claim 1, wherein the outside groove of the retainer has a trapezoidal form in transverse section; and the retainer has a tapered guide groove at each end to locate circumferentially one of the second projections of a respective end ring with respect to the retainer and wherein the one of the second projections of the respective end ring, when subjected to an elastic deformation under cooperation with the retainer, is movable along the tapered guide groove to fit the one of the second projections into the outside groove.

8. The linear bushing according to claim 7, wherein one of the second projections of each end ring extends lengthwise between inside circular grooves of each end ring and is formed in symmetry with respect to a central location of the raceway groove of the retainer.

9. The linear bushing according to claim 8, wherein the one of the second projections of each end ring is made to fit over a respective end of the retainer, and wherein the one of the second projections is guided along the outside groove of the retainer to move in a direction from one of the opposite ends of the retainer to the other of the opposite ends of the retainer.

10. The linear bushing according to claim 1, wherein each end of the retainer have lengthwise holes to insert an inspecting member to inspect and determine the number of rolling elements in the circulating groove and wherein the holes are made at locations corresponding to the centers of the raceway grooves of the circulating grooves.

11. The linear bushing according to claim 1, wherein the outer sleeve of the slider has a polygonal configuration which is defined by the polygonal outside surface and the polygonal inside surface of the outer sleeve, which are spaced from each other to provide a uniform thickness between them, and wherein the outer sleeve has a quadrant configuration in transverse section, composed of four flat side surfaces and four corners lying between the flat side surfaces.

* * * * *